United States Patent [19]
Ghosh

[11] 3,737,585
[45] June 5, 1973

[54] REGENERATIVE PCM LINE REPEATER

[75] Inventor: Suhas Ghosh, Raleigh, N.C.

[73] Assignee: International Telephone and Telegraph Corporation, Nutley, N.J.

[22] Filed: June 16, 1971

[21] Appl. No.: 153,546

[52] U.S. Cl. ..................179/15 AD, 328/164, 333/18
[51] Int. Cl. .................................................H04b 3/36
[58] Field of Search .......................179/170 R, 170 E, 179/170 T, 15 AD, 16 E, 16 EA; 328/164; 333/18, 28; 307/268, 269

[56] References Cited

UNITED STATES PATENTS

| | | | |
|---|---|---|---|
| 3,544,912 | 12/1970 | Zeaers et al. | 328/164 |
| 3,437,760 | 4/1969 | Kawashima et al. | 179/15 AD |
| 3,368,167 | 2/1968 | Graham | 333/18 |
| 3,261,986 | 7/1966 | Kawashima et al. | 179/15 AD |
| 2,996,578 | 8/1961 | Andrews, Jr. | 178/70 TS |
| 2,992,341 | 7/1961 | Andrews, Jr. et al. | 179/15 AD |

*Primary Examiner*—Kathleen H. Claffy
*Assistant Examiner*—Randall P. Myers
*Attorney*—C. Cornell Remsen, Jr., Walter J. Baum, Paul W. Hemminger et al.

[57] ABSTRACT

The line repeater operating on bipolar PCM signals includes substantially identical circuits for both directions of communication to provide line equalization, clock extraction, and pulse regeneration and retiming. A differential input, differential output operational amplifier has a line compensating network in a feedback path thereof. A peak detector coupled to both outputs of the operational amplifier and an amplitude comparator coupled to the output of the peak detector and a reference voltage produces a control signal to control the line compensating network and thereby compensate for line distortion of the received PCM signals and provide constant amplitude received PCM signals on both outputs of the operational amplifier. The clock extractor includes an average full wave rectifier coupled to both outputs of the operational amplifier, a tank circuit coupled to the output of the average rectifier and a 90° phase shifter and amplitude limiter to produce first square wave timing pulses prederminedly related to the bit rate and the zero crossings of the received PCM signals. The first timing signal has its negative going transistions differentiated and inverted to produce second timing pulses. The pulse regenerator includes a threshold voltage and two decision circuits coupled thereto and to the outputs of the operational amplifier, a different decision circuit being provided for each polarity of the received PCM signal. A different AND gate is coupled to the output of each of the decision circuits and are enabled by the second timing pulses. A different RS flip flop is coupled to the output of each of the AND gates and are reset by the positive going transistions of the second timing pulses. The output of the two RS flip flops are combined to provide regenerated bipolar PCM signals for transmission to the next line repeater. A direct current voltage coupled over the transmission line and a zener diode arrangement provides +V and −V power supply voltages at the repeater. A voltage of ±V volts is used in the operation amplifier of both directions of communication, a voltage of +V volts is used in the remainder of the circuits of one direction of communication and a voltage of −V volts is used in the remainder of the circuits of the other direction of communication.

22 Claims, 5 Drawing Figures

REGENERATIVE PCM LINE REPEATER

BACKGROUND OF THE INVENTION

The present invention is related to transmission line pulse code modulation (PCM) systems and more particularly to a two-way transmission line repeater used in such systems.

Transmission line repeaters having a self-equalizing and regeneration functions are well-known in the art and in particular the Bell Telephone System has spent much effort in designing such line repeaters. Design consideration and embodiments of transmission line repeaters, developed by the Bell Telephone System, are disclosed in the following articles: (1) R. A. Tarbox, "A Regenerative Repeater Utilizing Hybrid Integrated Circuit Techology," IEEE Conference on Communications, June, 1969, 69CP403-COM, pages 46–5 to 46–10 and (2) J. S. Mayo, "A Bipolar Repeater for Pulse Code Modulation Signals," BSTJ, Vol. 41, January, 1962, pages 25–97. This latter article may also be found in Bell Telephone System Monograph 4085, 1962, pages 209–281.

The repeater disclosed in these two above cited articles consist of two digital regenerator, one for each direction of transmission of communication, which share a common power supply in a parallel relationship with respect to the power supply. The bipolar PCM signal, after traversing through a dispersive, noisy medium is applied to a linear amplifier and automatic equalizer. It is the function of this circuit to provide the necessary amount of gain and phase equalization and, in addition, to band limit the signal in order to optimize the performance of the repeater for near-end cross talk produced by other systems operating within the same cable sheath. The preamplifier includes in its feedback path a variable line compensating network which is controlled by the output of a peak rectifier coupled to the antiphase outputs of the preamplifier.

The output signals of this preamplifier which are balanced and of opposite phases (antiphase) are applied to the clock extraction circuit and also to the pulse regenerator. The signals applied to the clock extraction circuit are full wave rectified and then applied to a high-Q resonant circuit to extract a 1.544 megahertz (MHz) frequency component from the applied signal. The output of the tank circuit is then operated upon to produce a single timing signal which controls (1) the time at which the output signals from the preamplifier are sampled and (2) the width of the regenerated pulses.

The pulse regenerator receives the output signals from the preamplifier and includes therein decision making or threshold circuits and sampling circuits for regeneration and retiming the distorted PCM pulse train. The threshold level of the decision circuits is set at half the peak output of the preamplifier and the zero crossings of the clock signal coincide with peaks of the preamplifier output. Thus the decision circuit gives an output when the input signal exceeds the threshold voltage. The output of the decision circuits are sampled by the clock signal which is also used through gate logic to control the width of the regenerated pulses.

SUMMARY OF THE INVENTION

An object of the present invention is to provide a self regulating two-way repeater based on a design adapted by the Bell Telephone System, said design being fully disclosed in the above cited articles, but having an implementation different from the implementation of the above cited articles with improved performance.

Still another object of the present invention is to provide a line repeater based upon the design considerations of the above cited articles of the Bell Telephone System, but having an implementation different than disclosed in the articles which is self equalizing, has improved clock stability and consumes almost one-half the power that is consumed by the line repeater disclosed in the cited articles.

A feature of the present invention is the provision of a two-way transmission line repeater for a PCM transmission line system comprising for each direction of communication: a repeater input to receive distorted bipolar type PCM signals from the transmission line; a repeater output to transmit regenerated bipolar type PCM signals to the transmission line; an automatic equalizer circuit including a preamplifier having its input connected directly to the repeater input, a non-inverting output and an inverting output, a peak rectifier connected to both the non-inverting and the inverting outputs of the preamplifier, a reference voltage, a variable line compensating network having an output coupled to the input of the preamplifier and a control input, and an amplitude comparator coupled to the reference voltage and the output of the peak rectifier to produce a control signal for coupling to the control input to maintain a constant amplitude signal at both the non-inverting and the inverting outputs of the preamplifier; a clock extraction circuit including an averaging rectifier coupled to the non-inverting and the inverting outputs of the preamplifier, a tank circuit tuned to the bit rate of the distorted PCM signals coupled to the output of the averaging rectifier, the tank circuit producing sine waves having a frequency equal to the bit rate and zero crossings shifted 90° lagging with respect to the zero crossings of the distorted PCM signals, a 90° phase shifter and amplitude limiter coupled to the tank circuit to produce first square wave timing pulses having a frequency equal to the bit rate, a 50 percent duty cycle and negative going transitions coincident with the peaks of the distorted PCM signals, and a differentiator and inverter coupled to the phase shifter and limiter to differentiate the negative going transitions of the first timing pulses and to invert the differentiated negative going transitions to produce second timing pulses; and a pulse regenerator including a threshold voltage, a first decision circuit coupled to the threshold voltage and the non-inverting output of the preamplifier to produce a binary "1" when the distorted PCM signals on the non-inverting output exceeds the threshold voltage, a second decision circuit coupled to the threshold voltage and the inverting output of the preamplifier to produce a binary "1" when the distorted PCM signals on the inverting output exceeds the threshold voltage, a first AND gate coupled to the output of the first decision circuit and the differentiator and inverter responsive to the second timing pulses, a second AND gate coupled to the output of the second decision circuit and the differentiator and inverter responsive to the second timing pulses, a first bistable device having its "1" input coupled to the output of the first AND gate and its "0" input coupled to the phase shifter and limiter responsive to the positive going transitions of the first timing pulses to regenerate the positive pulses of the distorted bipolar PCM signals, a second bistable device having its "1" input coupled to the output of the second AND gate and its "0" input coupled to the phase shifter and limiter responsive to the positive going transitions of the first timing pulses to regenerate the negative pulses of said distorted bipolar PCM signals, and a combiner coupled between the "1" output of both the first and second bistable devices and the repeater output to provide the regenerated bipolar PCM signals.

BRIEF DESCRIPTION OF THE DRAWING

Above-mentioned and other features and objects of this invention will become more apparent by reference to the following description taken in conjunction with the accompanying drawing in which:

FIGS. 3A and 3B are arranged as illustrated in FIG. 3C.

DESCRIPTION OF THE PREFERRED EMBODIMENT

Figure 1:
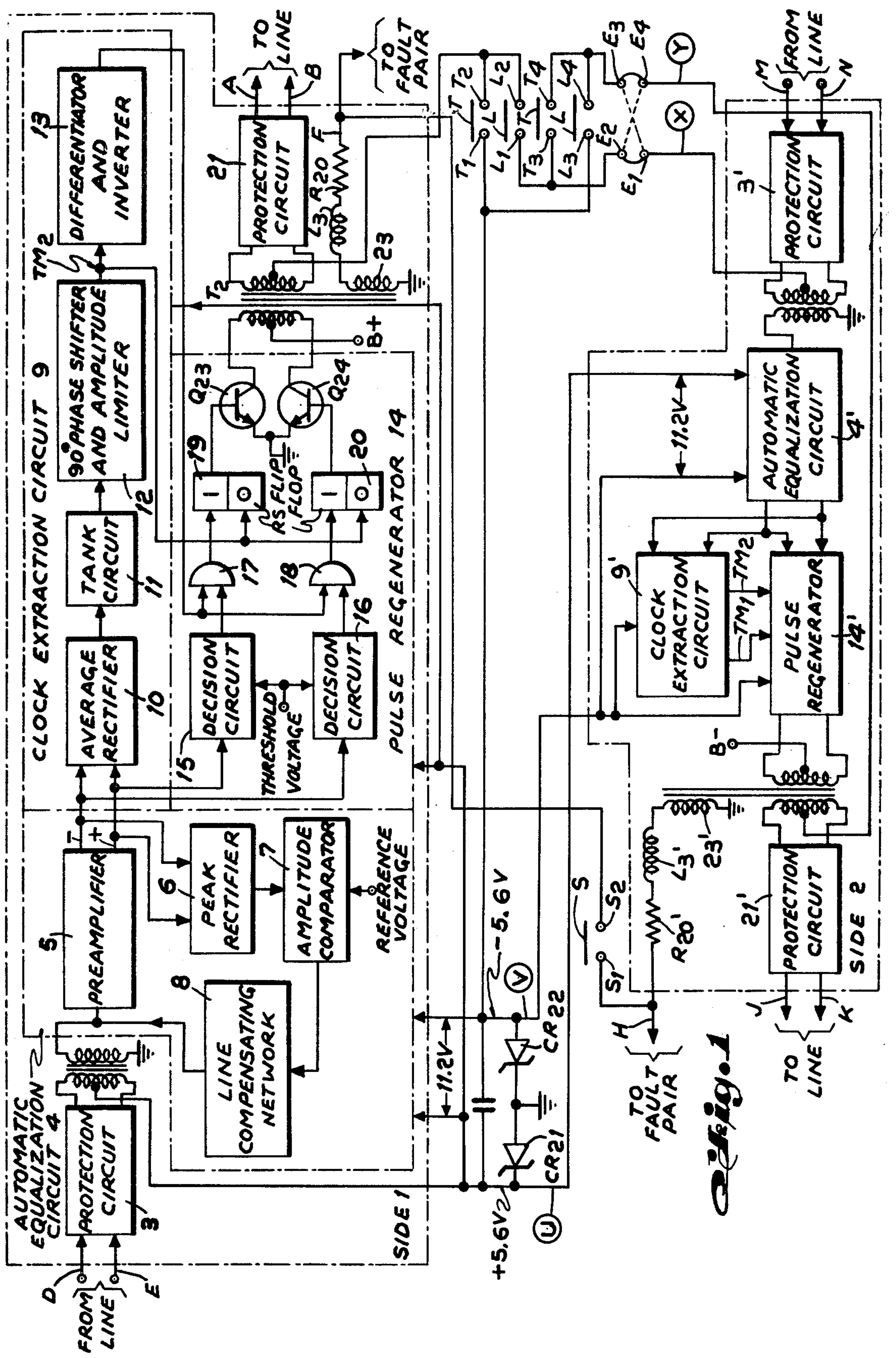
FIG. 1 is a block diagram illustrating the two-way line repeater in accordance with the principles of the present invention.

Referring to FIG. 1 there is disclosed therein a line repeater in accordance with the principles of the present invention having a side 1 connected to the transmission line to provide communication in one direction, such as East to West, and side 2 incorporating substantially identical circuitry as side 1 for the other direction of communication, such as from West to East. The only substantial difference between the components contained in sides 1 and 2 is that the preamplifier of the automatic equalization circuit of both sides 1 and 2 operate with a power supply voltage of ± 5.6 volts while the remainder of the circuitry of side 1 operates with a power supply voltage of + 5.6 volts and the remainder of the circuitry of side 2 operates with a power supply voltage of −5.6 volts.

Basically the repeater of the present invention includes in both sides 1 and 2, surge protection circuits 3 and 3' coupled to the transmission line, by terminals D and E for circuit 3 and by terminals M and N for circuit 3'. The input to sides 1 and 2 is to automatic equalization circuit 4 which includes therein a preamplifier 5 providing the received distorted PCM signal at a non-inverting output (the output marked +) and an inverting output (the output marked −), said distorted PCM signal at the outputs of preamplifier 5 being controlled to have a constant peak amplitude. This control is provided by peak rectifying the antiphase outputs of preamplifier 5 in peak rectifier 6 whose output is compared with a reference voltage, selected to have a value equal to the desired peak amplitude output of preamplifier 5, in amplitude comparator 7. The control signal produced by comparator 7 controls the characteristic of the line compensating network 8 whose output is connected to the input of preamplifier 5.

Figure 2:
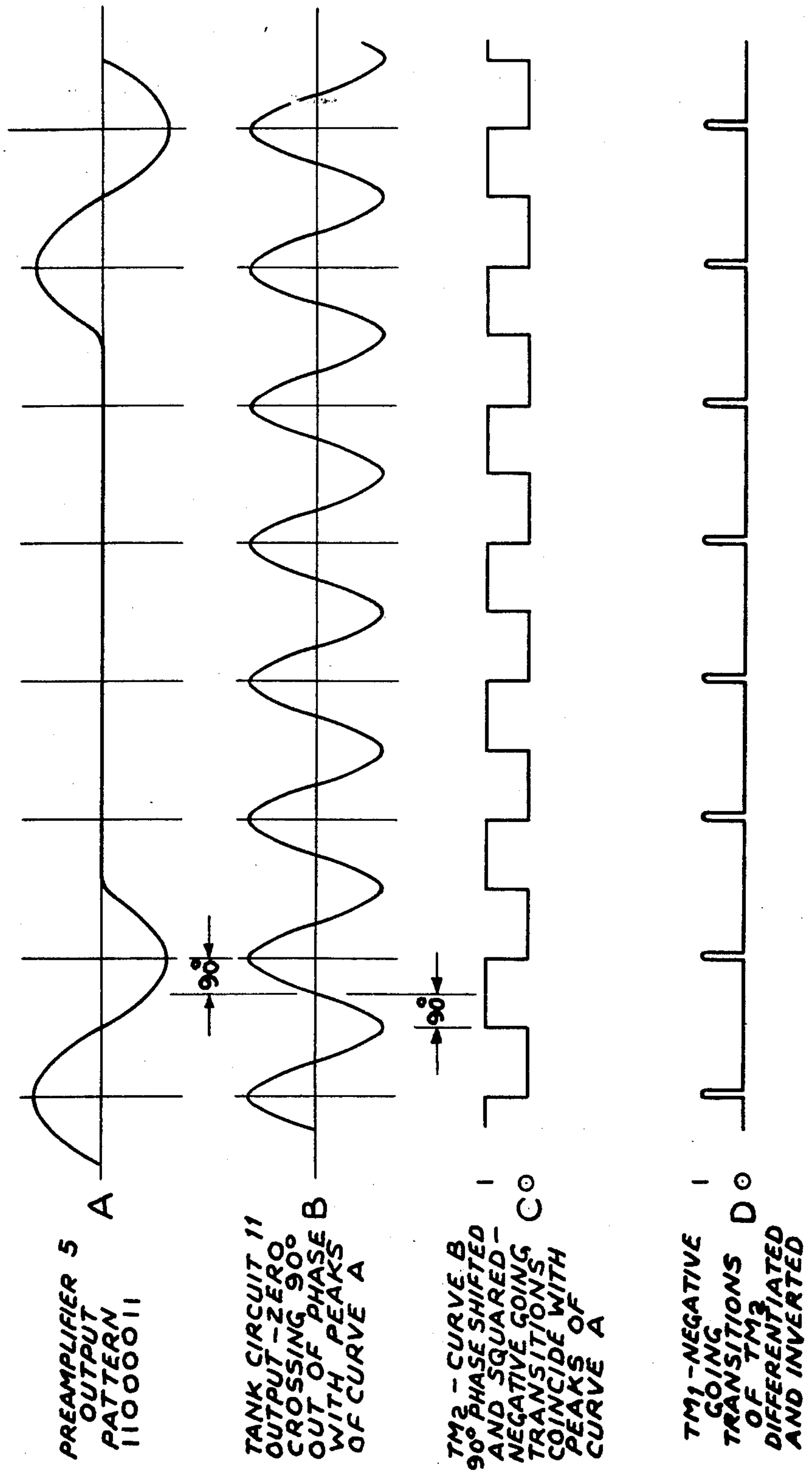
FIG. 2 is a timing diagram illustrating the generation of the two timing signals produced in the clock extraction circuit of FIG. 1.

The antiphase outputs of preamplifier 5 are coupled to clock extraction circuit 9 which includes therein a full wave average rectifier 10 and a tank circuit 11 tuned to 1.544 MHz. The sine wave of tank circuit 11 illustrated in Curve B, FIG. 2 is shifted 90° lagging with respect to the received distorted PCM signals illustrated in Curve A, FIG. 2. The output of circuit 11 is shifted 90° leading with respect to the sine wave of tank circuit 11 and then amplitude limited by phase shifter and amplitude limiter 12 which provides at its output square wave pulses TM2 illustrated in Curve C, FIG. 2 whose negative going transitions are time coincident with the peaks of the distorted PCM signal. The output of phase shifter and amplitude limiter 12 is coupled to a differentiator and inverter 13 which differentiates the negative going transition of the TM2 timing signal and inverts the resultant differentiated signal to provide the second timing signal TM 1 illustrated in Curve D, FIG. 2.

The antiphase outputs of preamplifier 5 are also coupled to pulse regenerator 14 which includes therein a decision circuit 15 coupled to the non-inverting output of preamplifier 5, therefore, responsive to the positve polarity pulses of the distorted bipolar PCM signals and a decision circuit 16 which is coupled to the inverting output of preamplifier 5 which causes decision circuit 16 to respond to the negative polarity pulses of the distorted bipolar PCM signal. Both circuits 15 and 16 are coupled to a common threshold voltage which is selected to having a value equal to one half the reference voltage applied to comparator 7. When the pulse input to decision circuits 15 and 16 exceed the threshold voltage binary "1" output is produced. When the pulse input to decision circuits 15 and 16 is less than the threshold voltage a binary "0" output results. The output of circuit 15 is coupled to one input of AND gate 17 and the output of circuit 16 is coupled to one input of AND gate 18. The other input of AND gates 17 and 18 are coupled to differentiator and inverter 13 and is responsive to the TM 1 timing signal. The output of AND gate 17 is coupled to "1" input of RS flip flop 19 while the output of AND gate 18 is coupled to the "1" input of RS flip flop 20. When there is a simultaneous presence of a binary "1" from either circuits 15 or 16 and a positive TM 1 pulse, AND gates 17 and 18 will produce a binary "1" output which is used to set flip flops 19 and 20 to provide a binary "1" output. The duration of the binary "1" output of flip flops 19 and 20 is determined by the width of the TM2 timing signal, since the positive going transition of the TM2 timing signal resets flip flops 19 and 20. The resultant output of flip flops 19 and 20 are combined by means of transistors Q23 and Q24 and the primary winding of transformer T2. Protection circuit 21 is similar to circuit 3 and is provided between the secondary winding of transformer T2 and the output terminal A and B coupled to the transmission line.

The line repeater illustrated in FIG. 1 is designed to equalize line characteristics of exchange type cables 16AWG and 26 AWG (American Wire Gauge). Any length of any combination of these type cables may be used provided that the total loss at 772 KHz (kilohertz) lies between 10dB (decibels) and 36dB and the slope is approximately 6dB per octave under all conditions of termperature and cable variations.

Each repeater unit, as previously mentioned, comprises two regenerators identified in FIG. 1 as sides 1 and 2. The same repeater unit can be used for either one cable or two cable (one housing) operation by using the technique of special frogging. Four screws or contacts on an option block assembly enable the simplex power feed from the transmission line to be switched "through" or "looped." Power for the repeater operation is received on the transmission line from a constant current source which can be adjusted to supply 70 to 200 ma(miliamperes). A strapping option is also available for two cable, two housing operation of the repeater unit. This strapping option and the power feeding options will be discussed hereinbelow in greater detail.

The digital signals received at the input of the repeater are in the form of an alternate bipolar signal, also called an alternate mark inversion (AMI) signal, at a pulse repetition frequency (PRF) of 1.544 megabits per second. Transmission of an alternate bipolar pulse train requires a transmission spectrum of about 1.5 MHz. Spectral power density, however, reaches maximum at ½PRF, and zero power at the PRF or multiples thereof, and DC (direct current). When the rectangular pulse train is transmitted into the reactive transmission line, the primary constants of the cable assume the appearance of a low-pass filter, removing the higher frequency components. As the digital pulses leave the repeater, each pulse is rectangular, occupying a time slot of approximately 648 nanoseconds at 50 percent duty cycle. Therefore, each pulse is 324 nanoseconds wide. As received at the next repeater input the rectangular pulses are attenuated, jittering, and distorted. The repeater equalizes for the line loss to substantially reduce distortion in the received signal, extracts timing information, and regenerates and retimes the pulse train for retransmission over the next section of the transmission line, The regenerated pulse train is essentially free from the noise accumulated in the previous transmission line section. However, if the noise peaks exceed a certain limit, errors may occur due to commission or omission of pulses. Such errors are, however, generally recognizable as violation of the bipolar pulse pattern.

The repeater as shown in FIG. 1 incorporates facilities that enable interrogation of a repeatered line from the central office. A pulse train which violates the bipolar pattern at a low frequency rate is transmitted from the office. A monitoring low pass filter coupled to terminals F and H of sides 1 and 2, respectively, of FIG. 1 are coupled to a low-pass filter which picks up the low frequency signal and returns it to the central office over a fault pair. Each repeater in a transmission line system is identified with a particular low frequency filter so that by transmitting a succession of predetermined tones from the central office and monitoring the return levels on the fault pair it is possible to identify a malfunctioning repeater which fails to return its identifying low frequency signal or tone.

The characteristic of the transmission line or cables used with the repeater of FIG. 1 can be approximated by fixed low frequency loss and a slope of 6dB per octave above a certain knee. The low frequency insertion loss and the knee frequency depends on the exact line length and the type of cable used.

Preamplifier 5 and its associated feedback circuitry including rectifier 6, comparator 7 and network 8, the components of an automatic gain control (AGC) circuit, are designed such that the line losses are compensated for and the overall characteristics of the line and preamplifier 5 are essentially flat up to about 800 KHz. The AGC circuit also ensures that the peak amplitude of the received PCM pulses at the output of preamplifier 5 is always constant.

The two antiphase outputs of preamplifier 5 are also presented to two decision circuits 15 and 16 which have fixed threshold at 50 percent of the peak amplitude. Circuits 15 and 16 decide whether the output signals of preamplifier 5 are above or below threshold (logical "1" or "0," respectively). In this way the effects of noise peaks below the threshold voltage are eliminated giving the repeater circuit a theoretical 6 dB noise immunity.

As previously mentioned the clock extraction circuit 9 includes phase shifter and amplitude limiter 12 which amplitude limits heavily and introduces a 90° leading phase shift with respect to the output signal of the tank circuit 11 so that the negative going transitions of the resultant square wave timing signal TM2 coincide with the centers of the "eye" pattern and, in other words, the peaks of the received PCM signals. This timing pulse is one of two timing waveforms, the other one being timing spikes or pulses TM 1 nearly 50 ns wide at the center of the digit periods which corresponds to the negative going transitions or zero crossings of the timing pulses TM2.

The heavy limiting provided in phase shifter and limiter 12 helps to reduce jitter caused by random pulse density variation.

The power supply for the two-way repeater is derived from two 5.6 volts zener diodes CR21 and CR22 having their common junction connected to ground as illustrated in FIG. 1, these zener diodes being fed over the transmission line. The preamplifier 5 of both sides 1 and 2 operate from a ±5.6 volts power supply. The rest of the circuitry for side 1 operates from a 0 to +5.6 volts power supply and the rest of the circuitry for side 2 operates from a −5.6 volts to 0 volts power supply. Thus, so far as current consumption is concerned the sides 1 and 2 are essentially in series rather in parallel as in the prior art arrangement. In this manner the current consumption for the repeater of the present invention is reduced to 70ma line current from about 140ma line current employed with the prior art arrangement.

Figures 3A, 3C:
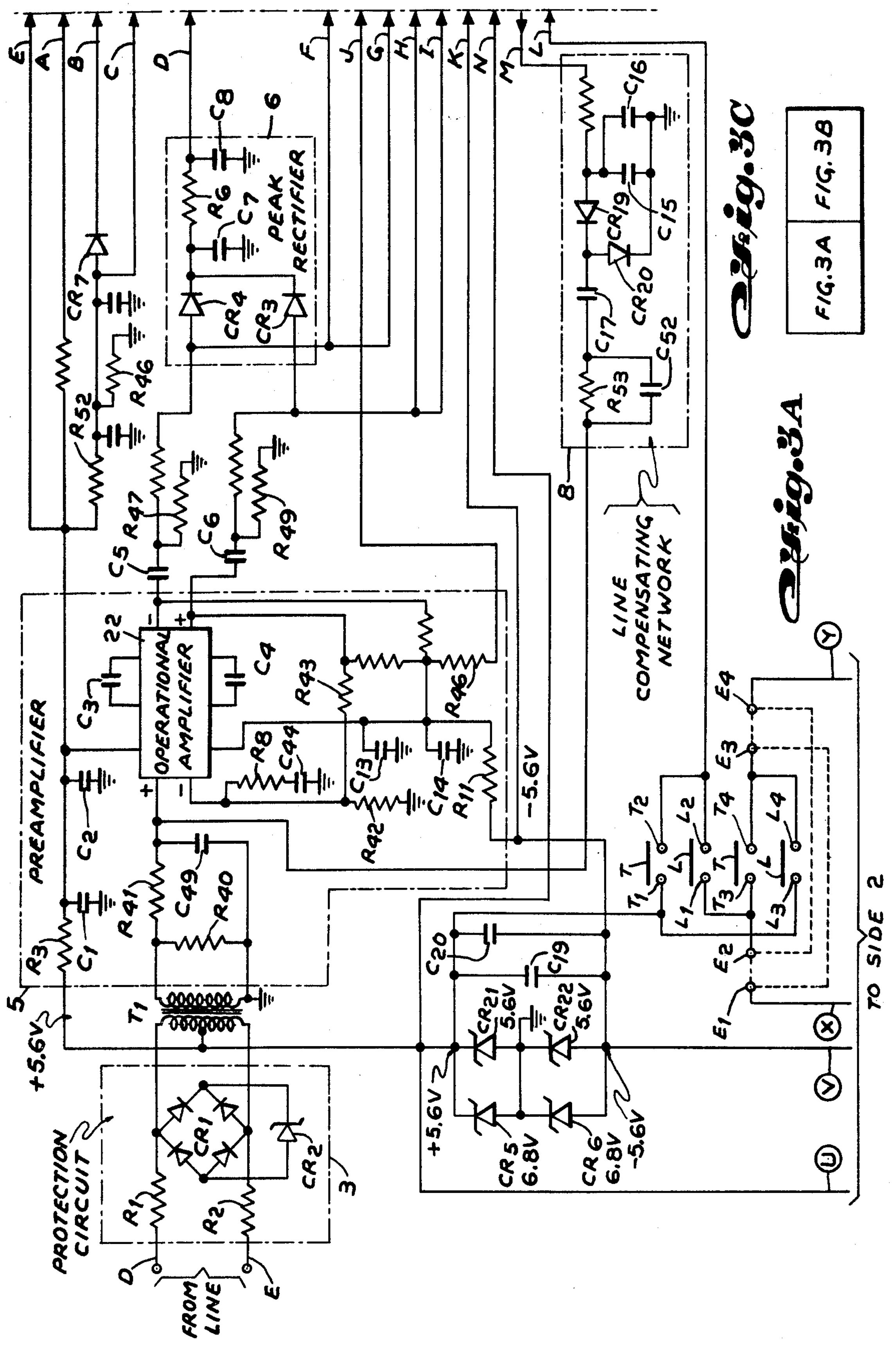
FIGS. 3A and 3B is a schematic diagram of side 1 of the repeater of FIG. 1 when the sheets containing
Figure 3B:
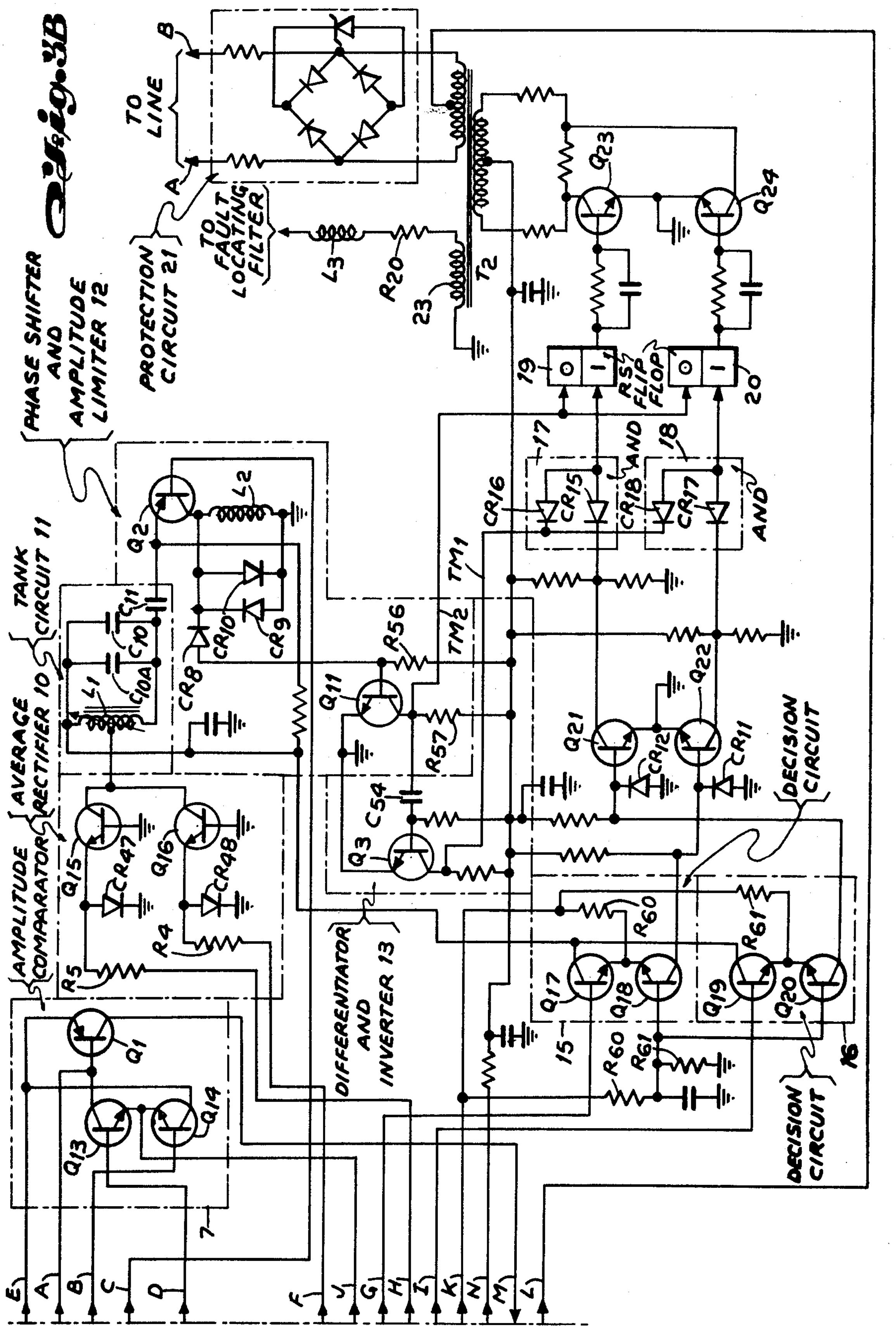

Referring now to FIGS. 3A and 3B, when organized as illustrated in FIG. 3C, there is disclosed therein a schematic diagram of side 1 of FIG. 1 which is substantially identical to the schematic diagram of side 2 of FIG. 1. The distorted bipolar PCM signal from the line is coupled to terminal D and E and then to secondary lightning or surge protection circuit 3 which includes resistors R1 and R2, diode bridge rectifier CR1 and zener diode CR2. The output of circuit 3 is coupled to the isolating transformer T1 which is terminated on its secondary side in a resistor R40 which has a value of 430 ohm which terminates the line in its characteristic impedance. Resistors R41 and R53, capacitor C52 and variable resistance diodes CR19 and 20 form the AGC (automatic gain control) and line compensating network 8. Capacitors C15, C16 and C17 are DC isolating capacitors. The major component of preamplifier 5 is a differential input, differential output operational amplifier 22. Resistors R42, R43, R8 and capacitor C44 form the feedback loop around amplifier 22 from the non-inverting output to the inverting input and determine the low frequency gain and slope of the amplifier. Capacitors C3, C4 and C49 determine the high frequency roll-off. Resistors R3 and R11, capacitors C1, C2, C13 and C14 provide power supply decoupling. The two antiphase output (non-inverting and inverting outputs) of amplifier 22 are returned to ground through capacitor C5 and C6 and resistors R47 and R49. These components also stop any 60 Hz component in the output signals from amplifier 22.

Diodes CR3 and CR4, resistor R6 and capacitor C7 and C8 form full wave peak rectifier 6 to monitor the peak amplitude of the output signals of amplifier 22. Capacitor C7 and resistor R6 ensure that isolated noise peaks do not affect the voltage across capacitor C8. Transistors Q13 and Q14 forming amplitude comparator 7 compare the rectified output voltage of rectifier 6 with the reference voltage determined by resistors R46 and R52. Diode CR7 compensates for diodes CR3 and CR4. The output signal of comparator 7 is amplified in transistor Q1 which provides the bias current for the variable resistance diodes CR19 and CR20 of line compensating network 8.

The timing extraction circuit includes full wave average rectifier 10 composed of resistors R4 and R5, transistors Q15 and Q16 and diodes CR47 and CR48 to full wave average rectify the two antiphase outputs of amplifier 22. The collector of transistors Q15 and Q16 are directly connected to the center tap of tuning inductor L1. Inductor L1 and capacitors C10A, C10 and C11 form a high Q tank circuit tuned to 1.544 MHz. The tuning range of the slug in inductor L1 is about ±2.5 percent. The factory selected capacitor C10A enables adjustment beyond the range provided by the slug.

Capacitor C11 works into the common base transistor stage Q2 with the output signal of transistor Q2 being in phase quadrature with that of the output signal of tank circuit 11. Inductor L2 and diodes CR9 and CR10 at the collector of transistor Q2 heavily limit the output of the tank circuit. The waveform at the collector of transistor Q2 is therefore nearly square and its amplitude is almost independent of the output of tank circuit 11. The transitions of the square wave are generated by the zero crossings of the sine wave of the tank circuit. Diode CR8, transistor Q11 and resistors R56 and R57 translate the square waves at the collector of transistor Q2 to square waves of peak amplitude of 4.5 volts and with the negative going transitions coinciding with the center of the "eye" pattern at the output of amplifier 22. The square timing wave or pulse at the collector of transistor Q11 is the TM2 time pulses referred to with respect to FIG. 1. The negative going transitions of timing pulses TM2 are differentiated by C54 and inverted by transistor Q3 to produce the narrow TM1 timing pulses approximately 50 nanoseconds wide.

The decision making and pulse regeneration is accomplished by comparing the two antiphase output signals from amplifier 22 with a preset threshold voltage (equal to one-half the reference voltage of comparator 7) by a pair of decision circuits 15 and 16. Decision circuit 15 includes transistors Q17 and Q18 while decision circuit 16 includes transistors Q19 and Q20. The threshold voltage is determined by resistors R60 and R61, respectively. Decision circuits 15 and 16 produce an output when the input exceeds the threshold voltage. This output is translated into integrated circuit logic compatible voltage levels by diodes CR11 and CR12 and transistors Q21 and Q22. The outputs of transistors Q21 and Q22 are high (binary "1") when the input signal exceeds the threshold voltage and low (binary "0") when the signal is below the threshold voltage.

RS flip flops 19 and 20 which may be comprised of four NOR gates appropriately cross connected to form the two RS flip flops. At the "1" input of flip flop 19 is AND gate 17 including germanium diodes CR15 and CR16 and to the "1" input of flip flop 20 is connected AND gate 18 including germanium diodes CR17 and CR18. The two outputs of the decision circuits 15 and 16 go to one input of the two AND gates 17 and 18 and the other input of these two AND gates are tied together to the timing pulses TM1.

If the output of a decision circuit is "1" indicating that a pulse has been received, the associated AND gate will produce a high output coincident with the timing pulses TM1, setting the "1" output of the corresponding flip flop high. The flip flop is reset to provide a "0" output on its "1" output half a time period later by the positive going transition of timing pulses TM2. The output signals from the two flip flops 19 and 20 therefore correspond to the two polarities of the signal received at the input to the repeater.

The two flip flops 19 and 20 drive the two output transistors Q23 and Q24. The primary winding of the output transformer T2 combines the output signals of transistors Q23 and Q24. The secondary winding of transformer T2 is connected to the line terminals A and B through a secondary lightning or surge protection circuit 21 similar to the surge protection circuit 3 at the input of transformer T1. The waveform at terminals A and B is a train of bipolar halfwidth pulses, ideally a replica of the pulses transmitted by the previous repeater.

Secondary winding 23 of the output transformer T2 is provided for connection to a fault locating filter. Inductor L3 and resistor R20 function as a simple low pass filter to pass a low test frequency without loading the bipolar signal. However, the values of inductor L3 and resistor R20 are also chosen to provide some preequalization for the transmitted signal.

Interconnection for the fault windings can be explained by reference to FIG. 1. The ground end of winding 23 in both sides of the repeaters in a housing are commoned to the ground line of the fault locating filter. Terminals F and H of both sides of the repeater are normally strapped together by connecting strap S to contacts S1 and S2. Terminals F and H are returned to the live side of the fault filter which is common to both sides of all repeaters in the same housing.

Where loop interrogation facilities are incorporated the strap S is removed from the contacts S1 and S2 but the terminals F and the terminals H of all repeaters in a housing are separately commoned or connected together and returned to two separate inputs to a loop interrogation unit.

Referring to both FIGS. 1 and 3A the alternative power feed arrangements will be described.

Power for the repeater is simplexed over the physical cable pair. The voltage across the repeater is determined by two 5.6 volt zener diodes CR21 and CR22. Capacitors C19 and C20 cooperate in filtering out 60Hz longitudinal induction in the line from the supply bus of the repeater. The supply current may pass through a repeater or may be looped back at repeater location. When the screws on the terminal block are connected for "thru" operation by closing straps T on the associated contacts T1, T2, T3 and T4, current passes from the input of side 1 (terminals D and E) through the two zener diodes CR21 and CR22 to the output of side 1 (terminals A and B). The current is looped at a distant repeater and returned via a distant repeater and returned via the input (terminals M and N) and output of side 2 (terminals J and K).

If the straps T are left in the position illustrated and straps L are positioned to connect contact L1 to contact L2 and contact L3 to contact L4 a "loop" current operation is possible. In this arrangement the current passes from the input of side 1 (terminals D and E) through the zener diode CR21 and CR22 to the output of side 2 (terminals J and K). Current from the opposite direction enters from the input of side 2 (terminals M and N) and returns via the output side 1 (terminals A and B).

Terminals E1, E2, E3 and E4 are provided to enable looping for one cable or two cable operation. For one cable or two cable, one housing operation, terminals E1 and E2 and E3 and E4 are strapped together as illustrated and the operation is as explained above. For two cable, two housing operations contact E1 is strapped to contact E3 and contact E2 is strapped to contact E4 as illustrated by the dotted lines. With this operation, the "thru" operation is the same as described above. However, for "loop" operation, current passes from the input of side 1 (terminals D and E) through zener diodes CR21 and CR22 and returns via the input of side 2 (terminals M and N). Current from the opposite side enters the output of side 2 (terminals J and K) and returns through the output of side 1 (terminals A and B).

In addition to the primary lightning protection afforded by the gas tubes or carbon protectors on the liner of the repeater housing, secondary protection is a permanent feature of the repeater in accordance with the principles of this invention. Two types of secondary protection are provided. First, transversal surge protection is provided at the two inputs and two outputs through the action of a unique zener diode circuit. Consider for instance protection circuit 3 coupled to terminals D and E of FIG. 3A. Zener diode CR2 is connected across two apices or diagonal junctions of a diode bridge rectifier CR1. A transversal surge peak of either polarity on either line wire will cause zener diode CR2 to zener. This circuit has the following two advantages: (1) one zener diode can do the work of two zener diodes in the usual back-to-back arrangement, and (2) bridge rectifier CR1 isolates the capacity of the zener diode CR2 and the waveform is not deteriorated as is the case in the back-to-back arrangement which causes pulse shape deterioration by the inherent capacity of the zener diodes. The second secondary protection is provided by parallelling zener diode CR21 with zener diode CR5 and parallelling zener diode CR22 with zener diode CR6. Zener diodes CR5 and CR6 are 6.8 volt zener diodes of higher surge rating than the 5.6 volt zener diodes CR21 and CR22. This combination increases the capacity of CR21 and CR22 to withstand longitudinal surge by a factor of at least three.

While I have described above the principles of my invention in connection with specific apparatus it is to be more clearly understood that this description is made only by way of example and not as a limitation to the scope of my invention as set forth in the objects thereof and in the accompanying claims.

I claim:

1. A two-way transmission line repeater for a pulse code modulation (PCM) transmission line system comprising for each direction of communication:

a repeater input to receive distorted bipolar type PCM signals from said transmission line;

a repeater output to transmit regenerated bipolar type PCM signals to said transmission line;

an automatic equalizer circuit including

- a preamplifier having its input connected to said repeater input, a non-inverting output and an inverting output,
- a peak rectifier connected to both said non-inverting and said inverting outputs of said preamplifier,
- a reference voltage source,
- a variable line compensating network having a control input and an output coupled to the input of said preamplifier, and
- an amplitude comparator coupled to said reference voltage source and the output of said peak rectifier to produce a control signal for coupling to said control input to maintain a constant amplitude signal at both said non-inverting and said inverting outputs of said preamplifier;

a clock extraction circuit including

- an averaging rectifier coupled to said non-inverting and said inverting outputs of said preamplifier,
- a tank circuit tuned to the bit rate of said distorted PCM signals coupled to the output of said averaging rectifier, said tank circuit producing sine waves having a frequency equal to said bit rate and zero crossings shifted 90° with respect to the peaks of said distorted PCM signals,
- a 90° phase shifter and amplitude limiter coupled to said tank circuit to produce first square wave timing pulses having a frequency equal to said bit rate, a 50 percent duty cycle and negative going transitions coincident with the peaks of said distorted PCM signals, and
- a differentiator and inverter coupled to said phase shifter and limiter to differentiate the negative going transitions of said first timing pulses and to invert the differentiated negative going transitions to produce second timing pulses; and a pulse regenerator including

- a threshold voltage source to provide a given threshold voltage,
- a first threshold circuit coupled to said threshold voltage source and said non-inverting output of said preamplifier to produce a binary "1" when said distorted PCM signals on said non-inverting output exceeds said threshold voltage,
- a second threshold circuit coupled to said threshold voltage source and said inverting output of said preamplifier to produce a binary "1" when said distorted PCM signals on said inverting output exceeds said threshold voltage,
- a first AND gate coupled to the output of said first threshold circuit and said differentiator and inverter responsive to said second timing pulses,
- a second AND gate coupled to the output of said second threshold circuit and said differentiator and inverter responsive to said second timing pulses,
- a first bistable device having its "1" input coupled to the output of said first AND gate and its "0" input coupled to said phase shifter and limiter responsive to the positive going transitions of said first timing pulses to regenerate the positive pulses of said distorted bipolar PCM signals, a second bistable device having its "1" input coupled to the output of said second AND gate and its "0" input coupled to said phase shifter and limiter responsive to the positive going transitions of said first timing pulses to regenerate the negative pulses of said distorted bipolar PCM signals, and means coupled between the "1" output of both said first and second bistable devices and said repeater output to combine the resultant output signals of said first and second bistable devices to provide said regenerated bipolar PCM signals.

2. A repeater according to claim 1, wherein each of said first and second bistable devices includes a RS type flip flop.

3. A repeater according to claim 1, wherein said preamplifier includes an operational amplifier having a non-inverting input, an inverting input, a non-inverting output and an inverting output.

4. A repeater according to claim 3, wherein said non-inverting input of said operational amplifier is coupled to said repeater input, said inverting input of said operational amplifier is coupled to a bias network, and both said non-inverting and said inverting outputs are coupled to said peak rectifier and said averaging rectifier.

5. A repeater according to claim 4, wherein said line compensating network is coupled between said amplitude comparator and said non-inverting input of said operational amplifier.

6. A repeater according to claim 5, wherein said line compensating network includes a pair of variable resistance diodes coupled to said amplitude comparator and responsive to said control signal to maintain a constant amplitude signal at both said non-inverting and said inverting outputs of said operational amplifier.

7. A repeater according to claim 1, further including a first surge protection circuit coupled between said transmission line and said repeater input; and a second surge protection circuit coupled between said transmission line and said repeater output.

8. A repeater according to claim 7, wherein each of said first and second protection circuits includes a diode bridge rectifier having one pair of diagonal junctions coupled to said transmission line, and a zener diode coupled across the other pair of diagonal junctions of said bridge rectifier.

9. A repeater according to claim 1, further including a direct current voltage coupled over said transmission line, a first pair of series connected zener diodes poled in the same direction, the junction of said first pair of zener diodes having coupled to ground to produce a predetermined power supply voltage of +V with respect to said ground and −V with respect to said ground, and wherein said preamplifier of each direction of communication has a power supply voltage of +V, substantially all the remainder of the circuits in said repeater of one direction of communication has a power supply voltage of ±V, and substantially all the remainder of the circuits in said repeater of the other direction of communication has a power supply voltage of −V.

10. A repeater according to claim 9, further including a second pair of series connected zener diodes poled in the same direction with respect to each other and said first pair of zener diodes and connected in parallel relation with respect to said first pair of zener diodes and said ground, said second pair of zener diodes having a higher surge rating than said first pair of zener diodes.

11. In a two-way transmission repeater for a pulse code modulation (PCM) transmission line system having, for each direction of communication, a repeater input to receive distorted bipolar type PCM signals from said transmission line, an automatic equalizer circuit for each direction of communication comprising:

a preamplifier having its input connected to said repeater input, a non-inverting output and an inverting output;

a peak rectifier connected to both said non-inverting and said inverting outputs;

a reference voltage source;

a variable line compensating network having a control input and an output coupled to the input of said preamplifier; and an amplitude comparator coupled to said reference voltage source and the output of said peak rectifier to produce a control signal for coupling to said control input to maintain a constant amplitude signal at both said non-inverting and inverting outputs.

12. An equalizer circuit according to claim 11, wherein said preamplifier includes an operational amplifier having a non-inverting input, an inverting input, a non-inverting output and an inverting output.

13. An equalizer circuit according to claim 12, wherein said non-inverting input of said operational amplifier is coupled to said repeater input, said inverting input of said operational amplifier is coupled to a bias network, and both said non-inverting and said inverting outputs are coupled to said peak rectifier.

14. An equalizer circuit according to claim 13, wherein said line compensating network is coupled between said amplitude comparator and said non-inverting input of said operational amplifier.

15. An equalizer circuit according to claim 14, wherein said line compensating network includes a pair of variable resistance diodes coupled to said amplitude comparator and responsive to said control signal to maintain a constant amplitude signal at both said non-inverting and said inverting outputs of said operational amplifier.

16. An equalizer circuit according to claim 11, further including a surge protection circuit coupled between said transmission line and said repeater input.

17. An equalizer circuit according to claim 16, wherein said protection circuit includes a diode bridge rectifier having one pair of diagonal junctions coupled to said transmission line and said repeater input, and a zener diode coupled across the other pair of diagonal junctions of said bridge rectifier.

18. In a two-way transmission line repeater for a pulse code modulation (PCM) transmission line system having, for each direction of communication, a repeater input to receive distorted bipolar type PCM signal from said transmission line and an automatic equalizer circuit coupled to said repeater input to provide said distorted bipolar PCM signals with a constant amplitude on an inverting output and a non-inverting output therefrom, a clock extraction circuit for each direction of communication comprising:

an averaging rectifier coupled to said non-inverting and said inverting outputs;

a tank circuit tuned to the bit rate of said distorted PCM signals coupled to the output of said averaging rectifier, said tank circuit producing sine waves having a frequency equal to said bit rate and peaks shifted 90° with respect to the peaks of said distorted PCM signals;

a 90° phase shifter and amplitude limiter coupled to said tank circuit to produce first square wave timing pulses having a frequency equal to said bit rate, a 50 percent duty cycle and negative going transitions coincident with the peaks of said distorted PCM signals; and a differentiator and inverter coupled to said phase shifter and limiter to differentiate the negative going transitions of said first timing pulses and to invert the differentiated negative going transitions to produce second timing pulses.

19. In a two-way transmission line repeater for a pulse code modulation (PCM) transmission line system having, for each direction of communication, a repeater input to receive distorted bipolar type PCM signals from said transmission line, a repeater output to transmit regenerated bipolar type PCM signals to said transmission line, an automatic equalizer circuit coupled to said repeater input to provide said distorted bipolar PCM signals with a constant amplitude on an inverting output and a non-inverting output therefrom, and a clock extraction circuit providing first square wave timing pulses having a frequency equal to the bit rate of said distorted PCM signals, a 50 percent duty cycle and negative going transitions coincident with the peaks of said distorted PCM signals and second timing pulses having a positive polarity and being a differentiated version of the negative going transitions of said first timing pulses, a pulse regenerator for both directions of communication comprising:

a threshold voltage source to provide a given threshold voltage;

a first threshold circuit coupled to said threshold voltage source and said non-inverting output to produce a binary "1" when said distorted PCM signals on said non-inverting output exceeds said threshold voltage;

a second threshold circuit coupled to said threshold voltage source and said inverting output to produce a binary "1" when said distorted PCM signals on said inverting output exceeds said threshold voltage;

a first AND gate coupled to the output of said first threshold circuit and said extraction circuit responsive to said second timing pulses;

a second AND gate coupled to the output of said second threshold circuit and said extraction circuit responsive to said second timing pulses;

a first bistable device having its "1" input coupled to the output of said first AND gate and its "0" input coupled to said extraction circuit responsive to the positive going transitions of said first timing pulses to produce regenerated positive pulses of said distorted bipolar PCM signals;

a second bistable device having its "1" input coupled to the output of said second AND gate and its "0" input coupled to said extraction circuit responsive to the positive going transitions of said first timing pulses to produce regenerated negative pulses of said distorted bipolar PCM signals; and means coupled between the "1" output of both said first and second bistable devices and said repeater output to combine the resultant output signals of said first and second bistable devices to provide said regenerated bipolar PCM signals.

20. A pulse regenerator according to claim 19, wherein each of said first and second bistable devices includes a RS type flip flop.

21. A pulse regenerator according to claim 19, further including a surge protection circuit coupled between said transmission line and said repeater output.

22. A pulse regenerator according to claim 21, wherein said protection circuit includes a diode bridge rectifier having one pair of diagonal junctions coupled to said transmission line and said repeater output, and a zener diode coupled across the other pair of diagonal junctions of said bridge rectifier.

* * * * *